United States Patent
Yun et al.

(10) Patent No.: US 10,333,888 B2
(45) Date of Patent: Jun. 25, 2019

(54) METHOD OF AUTOMATICALLY ASSIGNING IP IN SHIP AD-HOC NETWORK

(71) Applicant: KOREA INSTITUTE OF OCEAN SCIENCE & TECHNOLOGY, Ansan-si, Gyeonggi-do (KR)

(72) Inventors: Chang-Ho Yun, Sejong-si (KR); Seung-Geun Kim, Daejeon (KR); Yong-Kon Lim, Daejeon (KR)

(73) Assignee: KOREA INSTITUTE OF OCEAN SCIENCE & TECHNOLOGY, Ansan-si, Gyeonggi-do (KR)

( * ) Notice: Subject to any disclaimer, the term of this patent is extended or adjusted under 35 U.S.C. 154(b) by 234 days.

(21) Appl. No.: 15/229,014

(22) Filed: Aug. 4, 2016

(65) Prior Publication Data
US 2017/0156052 A1  Jun. 1, 2017

(30) Foreign Application Priority Data
Nov. 30, 2015  (KR) .................. 10-2015-0169308

(51) Int. Cl.
H04L 29/12 (2006.01)
(52) U.S. Cl.
CPC ...... *H04L 61/2007* (2013.01); *H04L 61/2053* (2013.01); *H04L 61/2061* (2013.01); *H04L 61/2092* (2013.01)
(58) Field of Classification Search
None
See application file for complete search history.

(56) References Cited

U.S. PATENT DOCUMENTS

| 2002/0186696 A1* | 12/2002 | Lim | ............ H04L 29/06 370/395.52 |
| 2007/0104215 A1* | 5/2007 | Wang | ............ H04L 45/02 370/458 |

FOREIGN PATENT DOCUMENTS

| KR | 10-2009-0065705 | 6/2009 |
| KR | 10-1339794 | 12/2013 |

OTHER PUBLICATIONS

Yun, et al., "Ship Ad-hoc Communication (SAC) Protocol for SANETs," Korea Ocean Research and Development Institute, Feb. 2, 2012, pp. 906-912.

* cited by examiner

*Primary Examiner* — Chi H Pham
*Assistant Examiner* — Raul Rivas
(74) *Attorney, Agent, or Firm* — Lewis Roca Rothgerber Christie LLP (57) ABSTRACT

A method of automatically assigning IP in a ship ad-hoc network includes (A) receiving a non-duplicate IP block from a terrestrial station by transmitting/receiving an IP request signal and an IP request response signal generated from a data link layer by one-hop ship stations able to perform direct transmission/reception with the terrestrial station; (B) allowing the one-hop ship stations receiving IP blocks to determine IPs thereof and to allocate IP blocks, as IP providers, to multi-hop ship stations able to perform indirect transmission/reception with the terrestrial station through ad-hoc communication when the multi-hop ship stations request the IP blocks; and (C) determining one of the IP providers to transmit an IP request signal such that the determined IP provider transmits an IP request response signal when multi-hop ship stations, to which the IP blocks are not allocated, receive MAC frames of plural IP providers in a channel allocation.

16 Claims, 6 Drawing Sheets

| Classification | | SANETconf | Mohsin'02 | FAP | DAD-PD | MANETconf |
|---|---|---|---|---|---|---|
| NI | Flood | 0 | 0 | $N_F(N+2C)$ | $\sum_{c=1}^{N-1} F_c$ | $\sum_{c=1}^{N-1} F_c$ |
| | Broadcast | 0 | 0 | 0 | $N_T N$ | $N_T N$ |
| | Unicast | 0 | 0 | 0 | $\sum_{c=1}^{N-1} U_c$ | $\sum_{c=1}^{N-1} U_c$ |
| PM | Flood | 0 | $2+4C$ | $N_F(C+2)$ | $N_F(N_P+2C)$ | $2+4C$ |
| | Broadcast | 0 | $3C$ | 0 | 0 | $3C$ |
| | Unicast | 0 | $4+C(N_p-1)$ | 2 | $2C$ | $4+C(N_p-1)$ |
| JN | Flood | 0 | 0 | $N_F$ | $N_F(1+C)$ | 2 |
| | Broadcast | $n_{pro}$ | 219) | 1 | 0 | $3+N_N$ |
| | Unicast | $n_{pro}$ | 520) | 1 | $N_F C$ | $N-1$ |
| PB | Flood | 0 | 0 | 0 | 0 | 0 |
| | Broadcast | $N+1$ | $N$ | $N$ | $N$ | $N$ |
| | Unicast | 0 | 0 | 0 | 0 | 0 |
| LN | Flood | 0 | 0 | $N_F$ | 0 | $N_F$ |
| | Broadcast | 0 | 1 | 0 | 0 | 0 |
| | Unicast | 0 | 4 | 0 | 0 | 0 |

Fig. 6

| parameter | definition |
|---|---|
| $N$ | Number of network nodes |
| $N_F$ | Number of flooding occurring from one source |
| $C$ | Number of IP collisions |
| $N_T$ | Number of confirming that any nodes do not exist in surrounding |
| $N_N$ | Number of neighbor nodes of joining node |
| $N_P$ | Number of nodes commonly concerned in both network partitions |
| $F_e$ | Number of messages of flooding occurring in network merging event $\ell$ |
| $U_e$ | Number of messages of unicast occurring in network merging event $\ell$ |
| $n_{pro}$ | Number of provider nodes in SANETconf |

METHOD OF AUTOMATICALLY ASSIGNING IP IN SHIP AD-HOC NETWORK

CROSS-REFERENCE TO RELATED APPLICATION

This application claims priority to Korean Patent Application No. 10-2015-0169308 filed on Nov. 30, 2015, and all the benefits accruing therefrom under 35 U.S.C. § 119, the contents of which is incorporated by reference in its entirety.

BACKGROUND OF THE INVENTION

1) Field of the Invention

The present invention relates to a method of automatically assigning IP, and more particularly, to a method of automatically assigning IP in a ship ad-hoc network, which is capable of preventing an IP collision by transmitting a unique IP in units of block in a tree form in consideration of a ship ad-hoc network environment and of greatly reducing an overhead by preventing messages for sharing an IP allocation state and IP allocation request messages from flooding.

2) Background of Related Art

In general, to use an IP-based service, a ship station must access to a terrestrial station connected to a network to enter the network in a ship ad-hoc network (SANET).

However, since a ship station moving on the sea is difficult to use a static IP address and must enter a sub-net of a terrestrial station through channel allocation, routing and data transmission, the ship station requires an IP address available in the sub-net of the terrestrial station for the purpose of routing and data transmission at IP level.

Differently from a stand-alone mobile ad-hoc network (MANET) which is not connected to Internet of an outside, although IP may be requested to a DHCP server in the ship ad-hoc network, the ship station uses an media access control (MAC) address or determines a temporary IP address by itself to flood the whole network with an address request in order to access to the DHCP server in a multi-hop situation in which routing is not set.

In a limited marine communication environment (the number of time slots and data rate limited), the message flooding for IP assignment may cause a great loss in a network bandwidth.

Therefore, a method of automatically assigning IP, which performs self IP assignment like a mobile ad-hoc network, must be considered rather than a method of assigning IP through a DHCP server.

To this end, as the automatic IP assignment method for a mobile ad-hoc network according to the related art, the studies on an automatic stateful IP assignment method and an automatic stateless IP assignment method have been performed.

However, in the automatic stateful IP assignment method, all nodes periodically broadcast IP states to share the IP states with each other, so that message overhead occurs due to the broadcasting.

In addition, although all nodes can share IP states with each other only when all nodes exist within communication radius of each other, an IP collision is unavoidable in the multi-hop environment in which a hidden terminal problem occurs.

Meanwhile, since the IP collision by a hidden terminal is unavoidable even in the automatic stateless IP assignment method due to random IP assignment, although the IP duplication is examined by using duplicate address detection (DAD) in order to prevent the IP collision, the IP collision still occurs due to network separation and aggregation caused by node movement.

In addition, since the message overhead is greatly increased due to flooding when the duplicate address detection is performed several times, when IP duplicate is examined by using information about a previous legacy protocol message instead of the duplicate address detection in order to reduce the message overhead, there is a need to change previous legacy protocol such as routing.

Thus, the application of the automatic IP assignment method for a mobile ad-hoc network to the ship ad-hoc network without art is inefficient and unsuitable.

Therefore, since, in the automatic IP assignment method, a limited time slot is self-allocated through TDMA-based MAC and data is transmitted at a low speed of 300 kbps or less, when the automatic IP assignment method is designed, there is a need to fully prevent an IP collision in order to reduce the message overheads spent for IP assignment and retransmission due to an IP collision in the routing setting and data transmission.

In addition, since hundreds of ship stations perform communication through VHF bandwidth, there is a need to provide a method capable of sufficiently assigning IP to ship stations accessing to a terrestrial sub-net without insufficiency even when only 16 bits are used for a suffix based on IPv4.

As a related art of the present invention, there is Korean Registered Patent No. KR 1339797 B1.

SUMMARY OF THE INVENTION

Therefore, an object of the present invention is to provide a method of automatically assigning IP in a ship ad-hoc network, which is capable of preventing an IP collision by transmitting IP in units of block in a tree form of the order of a terrestrial station, an one-hop ship station in consideration of a ship ad-hoc network environment and by assigning IP in units of block to a ship station to allow the ship station itself to be an IP provider.

In addition, another object of the present invention is to provide a method of automatically assigning IP in a ship ad-hoc network, which is capable of detecting an IP provider by utilizing MAC frames generated when the ship stations to which an IP block is allocated set routings and transmits/receives data, and of reducing the message overhead at the maximum by transmitting an IP request signal in a unicast scheme and transmitting an IP request response signal to a single ship station in the unicast scheme and to plural ship stations in a broadcasting scheme.

To achieve the objects, according to the present invention, there is provided a method of automatically assigning IP in a ship ad-hoc network, which includes: (A)

receiving a non-duplicate IP block from a terrestrial station by transmitting/receiving an IP request signal (AREQ) and an IP request response signal (AREP) generated from a data link layer by one-hop ship stations able to perform direct transmission/reception with the terrestrial station; (B) allowing the one-hop ship stations receiving IP blocks to determine IPs thereof, to perform data transmission/reception with the terrestrial station and to allocate IP blocks, as IP providers, to multi-hop ship stations able to perform indirect transmission/reception with the terrestrial station through ad-hoc communication when the multi-hop ship stations request the IP blocks; and (C) determining one of the IP providers to transmit an IP request signal (AREQ) such that the determined IP provider transmits an IP request response signal (AREP) when multi-hop ship stations, to which the IP blocks are not allocated, receive MAC frames of plural IP providers in a channel allocation.

Other details of the embodiments are described in the detailed description and accompanying drawings.

The advantages, the features, and schemes of achieving the advantages and/or features of the present invention will be apparently comprehended by those skilled in the art based on the embodiments, which are detailed later in detail, together with accompanying drawings. However, the present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

According to the present invention, since all IP blocks are assigned from a terrestrial station, even though a hidden terminal, a network is merged or separated, an IP collision due to a duplicate IP assignment may be prevented from occurring. In addition, the transmission/reception of an automatic IP assignment message is performed in a data link layer not to use a temporary IP, the IP collision due to using of the temporary IP may be prevented from occurring.

In addition, since any additional messages are not used for detecting an IP provider, the ship stations, to which IP blocks are assigned, are not required to transmit any additional advertising messages and a process of detecting duplicate addresses for preventing an IP collision is not required, so that any message overheads for confirming duplication do not exist.

DETAILED DESCRIPTION OF THE INVENTION

Hereinafter, embodiments of the present invention will be described in detail with reference to accompanying drawings.

It should be understood that the terms used in the specification and the appended claims should not be construed as limited general and dictionary meanings, but interpreted based on the meanings and concepts corresponding to technical aspects of the present invention on the basis of the principle that the inventor is allowed to define terms appropriately for the best explanation Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module" . . . apparatus", " . . . step" and so on, which are indicated in the description of the present invention, indicates units that process at least one function or operation. And, this may be realized in the form of hardware or software, or a combination of hardware and software.

Figure 1:
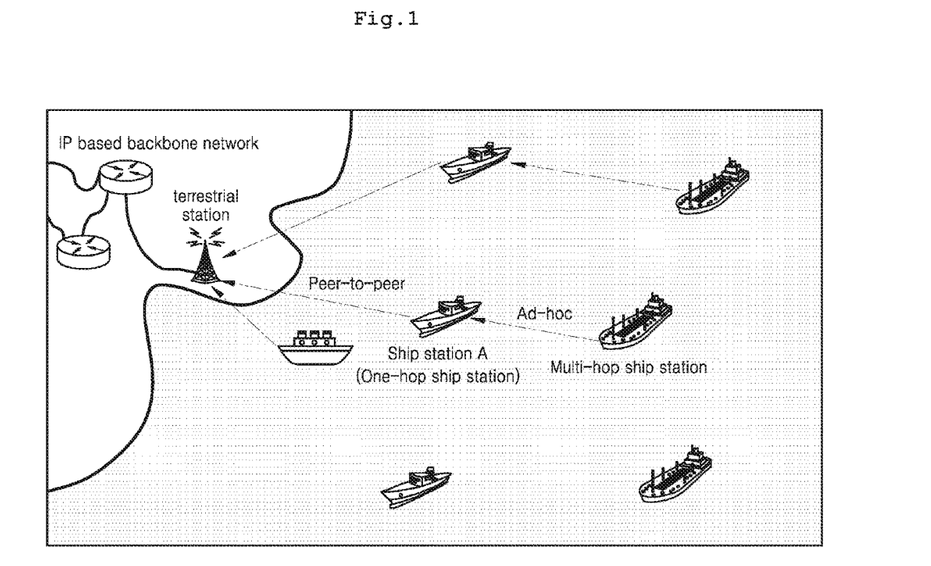
FIG. 1 is a view illustrating a system for implementing a method of automatically assigning IP in a ship ad-hoc network according to the present invention.

FIG. 1 is a view illustrating a system for implementing a method of automatically assigning IP in a ship ad-hoc network according to the present invention, where the system includes a terrestrial station, a one-hop ship station and a multi-hop ship station.

Figure 2:
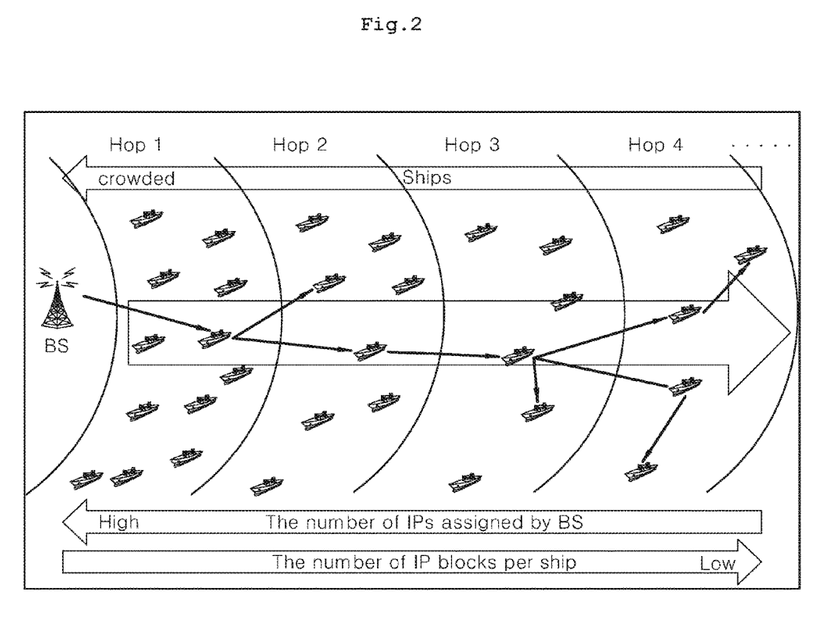
FIG. 2 is a view showing a tree structure for illustrating a basic concept of a method of automatically assigning IP in a ship ad-hoc network in the system depicted in FIG. 1.

FIG. 2 is a view showing a tree structure for illustrating a basic concept of a method of automatically assigning IP in a ship ad-hoc network in the system depicted in FIG. 1, where the system includes a terrestrial station, an one-hop ship station and a multi-hop ship station.

Figure 3:
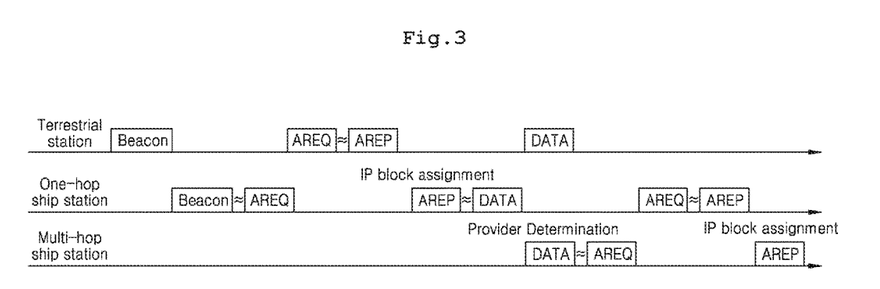
FIG. 3 is a flowchart of a signal and data transmitted/received from/at the system depicted in FIG. 2.

FIG. 3 is a flowchart of a signal and data transmitted/received from/at the system depicted in FIG. 2.

Figure 4:
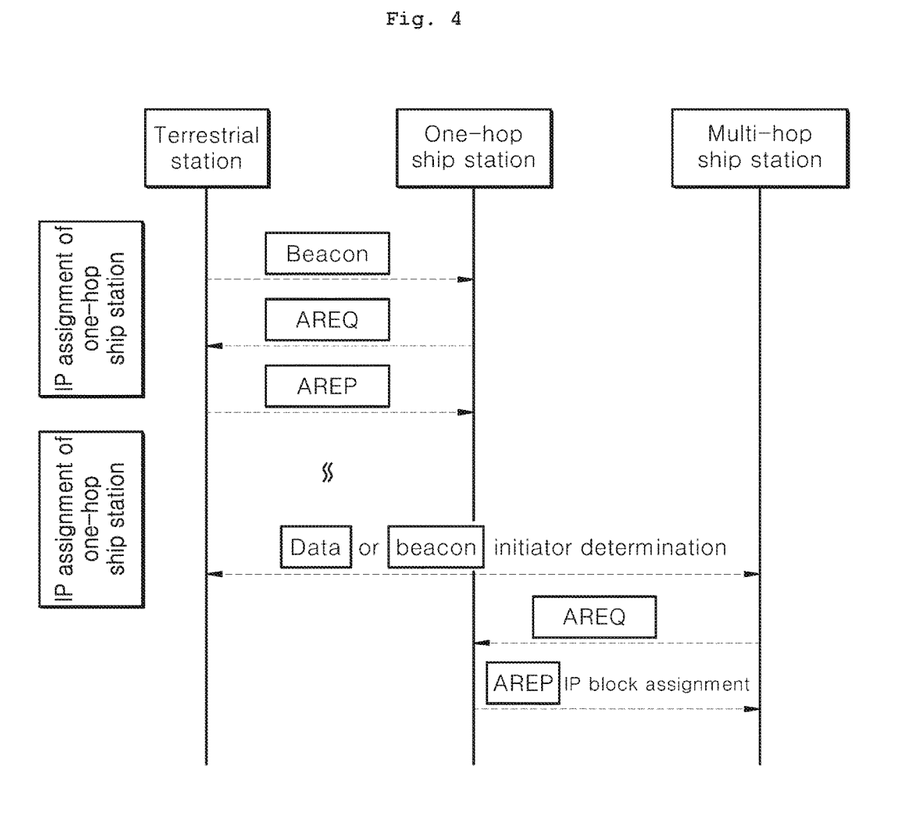
FIG. 4 is a flowchart illustrating a method of automatically assigning IP in a ship ad-hoc network according to the present invention.

FIG. 4 is a flowchart illustrating a method of automatically assigning IP in a ship ad-hoc network according to the present invention.

With reference to FIGS. 1 to 4, the operation flow of a method of automatically assigning IP in a ship ad-hoc network according to the present invention will be described as follows.

As shown in FIG. 1, the system includes an one-hop ship station capable of performing direct transmission/reception with a terrestrial state according to the mast length and the current location of a ship state, and a multi-hop ship station capable of performing indirect transmission/reception through ad-hoc communication. According to a method of automatically assigning IP in a ship ad-hoc network of the present invention, as in a mobile ad-hoc network according to the related art, the one-hop ship stations receive IP from the terrestrial station without a need to self-assign all nodes IP.

In addition, as shown in FIG. 2, since the distribution density of ship stations is gradually increased toward a coast and is gradually reduced as getting away from a coast, an IP assignment structure of a tree form, in which IP is transmitted from the one-hop ship station and the multi-hop ship station to the terrestrial station, is suitable.

According to the basic principle of the present invention, the one-hop ship stations receive non-duplicate IP blocks from the terrestrial station through the transmission/reception of IP request signal (AREQ)-IP request response signal (AREP) between the one-hop ship stations and the terrestrial station, such that the one-hop ship stations determine those own IPs by themselves to perform data transmission/reception with the terrestrial station. Alternatively, when the multi-hop ship stations request IP blocks, the one-hop ship stations assign IP blocks to the multi-hop ship stations like as IP providers.

That is, the one-hop ship stations transmit/receive an address request signal (IP request signal (AREQ)) and an IP request response signal (AREP) to/from the terrestrial station such that the one-hop ship stations receive non-duplicate IP blocks and information about a subnet.

The one-hop ship station which receives an IP block determines its own IP by itself and forms a routing to the terrestrial station. In addition, the one-hop ship station becomes an IP provider to assign an IP block to a multi-hop ship station when the multi-hop ship station requests the IP block.

When a multi-hop ship station to which IP is not assigned receives MAC frames from several IP providers when a channel is allocated, the multi-hop ship station selects one from the IP providers to transmit an IP request signal (AREQ) for requesting an IP block to the selected IP provider. The corresponding IP provider transmits an IP request response signal (AREP) including information about a range of its own assigned IP block, an assigned IP block and a subnet of a base station in response to the IP request signal (AREQ).

The scheme of transmitting an IP assigning message and the structure thereof according to the present invention are as follows. The IP request signal (AREQ) is transmitted in a unicast scheme, the IP request response signal (AREP) is transmitted in a unicast or broadcast scheme. The beacon signal is transmitted in a broadcast scheme.

For example, a ship or terrestrial station, which receives a plurality of IP request signals (AREQ) from mutually different ship stations, assigns an IP block by broadcasting an IP request response signal at a time such that a message overhead may be reduced.

The structure of the IP request signal (AREQ) includes a location of a ship station, the number $n_{pro}$ of IP providers and a weight element w.

In this case, although the weight element w determines a size $n_{IPBr}$ of an IP block assigned according to a value of the weight value w if the IP provider is a terrestrial station, as the number of IP block re-requests before an expiration time EX_Time, if the IP provider is a ship station, the weight element w is a reference of IP block assignment.

The structure of the IP request response signal (AREP) includes a location of a ship station, information about a subnet of a terrestrial station, a location of a terrestrial station, an expiration time EX_Time, the number $n_{AIPBp}$ of assignable IP blocks, and information about IP assignment of each ship station.

In this case, the information about IP assignment of each ship station includes information about possibility of assignment (ACK or NACK) and IP block information $n_{IPBr}$ (suffix of start IP).

The structure of a terrestrial station beacon signal includes information about a subnet of a terrestrial station, a location of a terrestrial station and the number of available IP blocks.

The structure of a ship station beacon signal includes its own location of a ship station, information about a subnet of a terrestrial station, a location of a terrestrial station, an expiration time EX_Time and the number $n_{AIPBp}$ of assignable IP blocks.

Addressing Protocol of Terrestrial Station

First, a terrestrial station periodically transmits a beacon signal to announce information about its own subnet and location.

When an IP request signal (AREQ) is received from a one-hop ship station, the terrestrial station determines an IP block based on the location information of the IP request signal (AREQ) and transmits an IP request response signal (AREP).

The method of determining an IP block is operated as follows.

If the ship or terrestrial station assigning an IP block is defined as an IP provider (p) and a ship station requesting an IP block is defined as an IP requester (r), after the terrestrial station divides the subnet into m hops, numbers $h_r$ ($1 \leq h_r \leq m$) of the hops are determined. Then, the size $n_{IPBr}$ of the IP block which the terrestrial station assigns to the IP requester is determined.

Since the IP block is assigned in a tree form in the direction getting away from the terrestrial station, more many IP blocks are assigned to the ship station near to the terrestrial station.

The size $n_{IPBr}$ of the IP block assigned to the IP requester of hop number $h_r$ is expressed as $w*2^{(m-hr+1)}$. It is set that a half of the number of IP blocks is to be assigned to two ship stations having hop difference of '1' by the terrestrial station.

In this case, w (w≥1) is used as a weighting factor to allow more many IPs to be assigned to the ship station when the ship station re-requests an IP block before the IP block previously assigned to the ship station expires.

When IP request signals (AREQ) are received from a plurality of one-hop ship stations, the terrestrial station broadcasts an IP request response signal (AREP) at a time to assign an IP block.

In an IP list update, the state of the IP block assigned in the IP range of the whole subnet is changed into 'Used', and the assigned MAC address and expiration time EX_time to the IP requester are added.

When it arrives at the expiration time EX_time of the IP block, the IP list is updated to change the state of the expired IP block into 'Free'.

Addressing Protocol of Ship Station

1. Case of Requesting IP Block From One-Hop Ship Station (IP Request Signal (AREQ) Transmission)

When a channel is allocated to transmit an IP request signal (AREQ) after receiving a beacon signal from a terrestrial station and an IP request response signal (AREP) is received from the terrestrial station as a response to the IP request signal (AREQ), the ship station updates the IP list and sets the first IP in the IP block as its own IP.

In this case, as the IP list is updated, the state of the self-assigned IP block is changed into 'Used' in the range of the self-assigned IP block, and the MAC address and expiration time EX_Time of the IP requester are denoted.

2. Case of Request IP Block From Multi-Hop Ship Station (IP Request Signal (AREQ) Transmission)

The ship station detects the IP provider before transmitting the IP request signal (AREQ) through the self-assigned channel and receives an MAC frame of a beacon signal, an IP request response signal (AREP), a non-IP assigning message (routing setting, data), etc., such that the IP provider list is updated. In the IP provider list update, the information about the number of assignable IP blocks $n_{AIPBp}$, the expiration time EX_Time and the location, which may be obtained only from the IP provider which transmits the beacon signal or the IP request signal (AREP), is displaced.

The ship station selects one IP provider from those in the updated IP provider list to transmit the IP request signal. (AREQ).

In this case, the condition for the IP provider among the ship stations which transmit the beacon signals or IP request response signals (AREP) is that a ship station must have '1' or more assignable IP blocks $n_{AIPBp}$ or transmit an IP unassigned message.

In addition, when the number $n_{pro}$ of IP providers is 2 or more, and only IP providers which transmit IP unassigned messages exist, the IP provider is randomly selected from the IP provider list. When the IP providers which transmit the IP unassigned message and beacon signal or the IP request response signal (AREP) exist, a ship station which transmits the beacon signal or the IP request response signal (AREP) is selected.

In this case, when the number of IP providers which transmit the beacon signal or the IP request response signal (AREP) is 2 or more, the IP providers are selected in the priority order of "number of assignable IP blocks>expiration time EX_time>close position".

3. Case that Ship Station Receives IP Block Request (IP Request Signal (AREQ) Reception)

The number of ship stations transmitting the IP request signals (AREQ) is calculated until a channel is allocated and is compared with the number $n_{AIPBp}$ of assignable IP blocks to determine an IP requester.

That is, when the number $n_{AIPBp}$ of assignable IP blocks>the number of ship stations transmitting the IP request signals (AREQ), the number of assigned IP blocks to the ship station is expressed as $$\left\lfloor \frac{n_{AIPBp}}{N_{AREQ}+1} \right\rfloor$$

When the number $n_{AIPBp}$ of assignable IP blocks≤the number of ship stations transmitting the IP request signals (AREQ), the number $n_{pro}$ of IP providers of the IP request signals (AREQ) is compared with the value of the weighting element w to select the ship stations corresponding to the number $n_{AIPBp}$ of assignable IP blocks such that one IP is selected.

In this case, the selection of the ship stations corresponding to the number $n_{AIPBp}$ of assignable IP blocks is performed in the priority order of sequence of less values in the numbers $n_{pro}$ of IP providers>sequence of larger values in weighting element w.

That is, when the ship stations have the same numbers $n_{pro}$ of IP providers, the ship station having a greater value among them is selected. When the values of the weight element w are equal to each other, the ship station is randomly selected.

The ship stations of the number $N_{AREQ}$ of IP request signal (AREQ) transmission ship stations–the number $n_{AIPBp}$ of assignable IP blocks transmit unassignable signals (NACK). When all IP blocks are assigned to the IP requesters, the ship stations re-request IP blocks while increasing the value of a weight element w and transmitting the increased values.

The ship stations broadcast IP request response signals (AREP) to the determined IP requesters.

In this case, as the IP list is updated, the state of the self-assigned IP block is changed into 'Used' in the range of the self-assigned IP block, and the MAC address and expiration time EX_Time of the IP requester are denoted.

4. Case that Ship Station Receives IP Block Request Response (IP Request Response Signal (AREP) Reception)

When the starting address of the received IP request response signal (AREP) is that of the IP provider to which the ship station requests an IP block and the destination address is the same as that of the ship station, the ship station confirms the payload. When the starting address of the received IP request response signal (AREP) is that of the IP provider to which the ship station requests an IP block and the destination address is a broadcasting address, the ship station confirms the payload to confirm whether a response to the IP request signal (AREQ) is included.

When the IP request response signal (AREP) of the assignable signal (ACK) is received form the IP provider, the ship station sets the first IP in the IP block as its own IP and updates the IP list.

If the IP request response signal (AREP) of the unassignable signal (NACK) is received form the IP provider, the ship station select another ship station from the IP provider list to retransmit the IP request signal (AREQ) and repeatedly performs the same process as that in case that the IP request response signal (AREP) (assignable signal (ACK) is received as many as the number $n_{pro}$ of IP providers.

If there is no IP provider, the ship station performs the network IP provider detection again and updates the IP list.

In this case, as the IP list is updated, the state of the self-assigned IP block is changed into 'Used' in the range of the self-assigned IP block, and the MAC address and its own expiration time EX_Time are denoted 5. After the Ship Station Sets Its Own IP, Like the Terrestrial Station, the Ship Station Periodically transmits a beacon signal to announce the fact that the ship station becomes an IP provider by itself.

6. When it Arrives at the Expiration Time EX_Time of the IP Block, the Ship Station Updates the IP List By Deleting the Expired IP Block.

Figure 5:
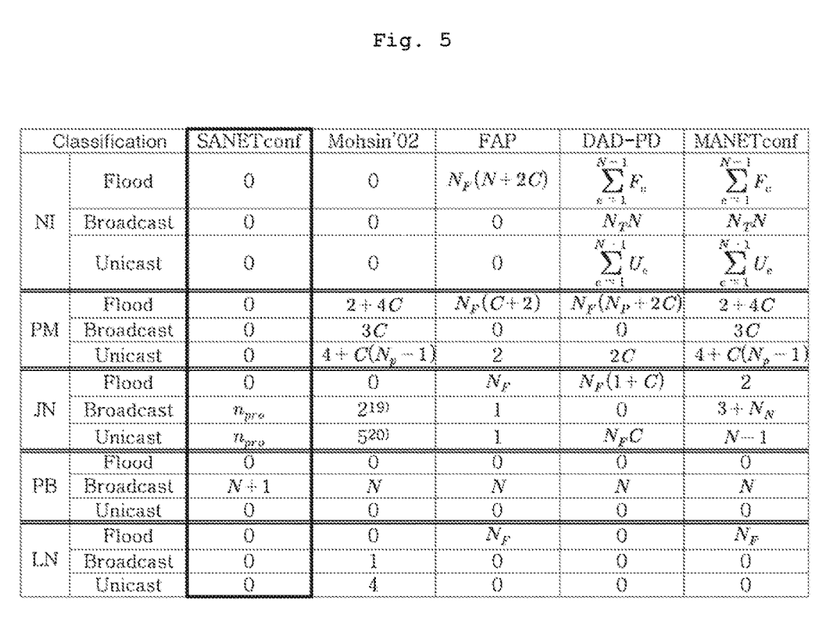
FIG. 5 a table in which results of actually measuring message overhead characteristics with respect to the method of automatically assigning IP in the ship ad-hoc network depicted in FIG. 1 are compared with addressing protocols according to the related art.

Performance Comparative Analysis With Address Protocols According to the Related Art FIG. 5 is a table in which the results of actually measuring message overhead characteristics with respect to the method of automatically assigning IP in the ship ad-hoc network depicted in FIG. 1 are compared with addressing protocols according to the related art. The message overhead characteristics include network initialization (NI), partition Merging (PM), a joining node (JN), in periodic broadcasting (PB), and overhead values at a leaving node (LN) according to broadcast and unicast.

Figure 6:
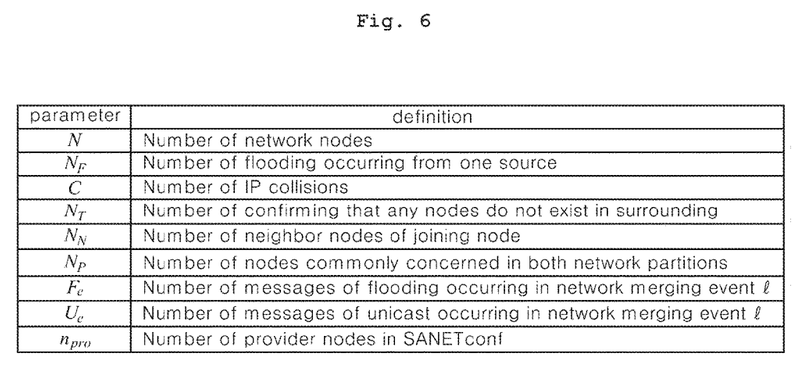
FIG. 6 is a table defining parameters used in the message overhead characteristics comparison table of FIG. 5.

FIG. 6 is a table defining parameters used in the message overhead property comparison table of FIG. 5.

In FIG. 5, Mohsin '02 is an addressing protocol for a dynamic IP block assigning method based on a binary split in consideration of network separation and merging.

FAP (Filter-based Addressing Protocol) is an addressing protocol which simplifies a frequent node entry process and simplifies a message overhead required to prevent a collision occurring in random IP assignment by using a filer when IP state DB of current assigned nodes is stored.

DAD (Duplicate Address Detection)—PD, which is an automatic stateless IP assignment method based on IVv6 in consideration of network separation and merging, is an addressing protocol which improves the performance based on IPv6 auto-configuration of IETF draft (2001) and neighbor discovery protocol according to the related art.

Although the mobile ad-hoc network conf, which is an automatic IP assignment method by correct Zeroconf method of the related art in consideration of network merging, is able to be utilized without regard to an IP version, since a timer is used in all processes including network entry, merging, resignation and the like, the IP assignment delay time is increased. In addition, since flooding is used in all processes, the mobile ad-hoc network conf is a protocol in which the message overhead is increased.

As shown in FIG. 6, as the result of performance comparative analysis with address protocols of the related art, the method of automatically assigning IP in a ship ad-hoc network according to the present invention is not influenced by the network merging by perfectly excluding any IP collisions due to IP block transmission in a tree form of terrestrial station-to-ship station, so that any message overhead required to process network merging and separation do not exist.

That is, any flooding overheads do not exist. In order to be assigned an IP block, the IP request signals (AREQ) are transmitted through one selected from the detected IP providers in unicast as many as the maximum number $n_{pro}$ of IP providers and it is only required to transmit IP request response signals (APEP) as many as the number $n_{pro}$ of the maximum IP providers.

As described above, according to the method of automatically assigning IP in a ship ad-hoc network of the present invention, any IP collisions due to duplicate IP assignment are prevented by transmitting a unique IP in units of block in a tree form of the order of a terrestrial station, an one-hop ship station and a multi-hop ship station and by allowing all IP block to be transmitted from a terrestrial station while being assigned even though the network separation and merging occur.

In addition, the IP range is sufficient compared with the number of ships and IPs are assigned to ship stations in units of block to transmit IP in the tree form of the order of a terrestrial station, an one-hop ship station and a multi-hop ship station to allow the ship station itself to be an IP provider, and an automatic IP assignment message is transmitted/received in a data link layer, so that any IP collisions which may be caused when temporary IPs ae used may be prevented.

Meanwhile, since any additional messages are not used for detecting an IP provider and the legacy MAC protocol is utilized without being changed, the ship stations assigned IP blocks are not required to be transmitted any additional advertising messages. In addition, it is possible to detect the IP providers by utilizing MAC frames generated when the routing is set by itself and data are transmitted. There is no need to performing a DAD process so that any overheads for confirming any IP duplications do not exist.

In addition, although an IP request signal (AREQ) and an IP request response signal (AREP) used for DAD is used to assign IP, the IP request signal (AREQ) transmitted to a single IP provider to request an IP block is unicasted so that flooding does not occur. Since the responses transmitted to at least one ship station requesting IP blocks are collected and are unicasted to a single ship station and broadcasted to plural ship stations, even though the information about IP assignment is not shared with neighbor ship stations, the message overhead may be reduced.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects. Therefore, it should be understood that the present invention is not limited to the embodiments described above. The scope of the present invention will be limited by the appended claims. In addition, it will also be apparent to those skilled in the art that variations or modifications from the appended claims and the equivalent concept of the claims are included in the scope of the present invention.

What is claimed is:

1. A method of automatically assigning IP in a ship ad-hoc network, the method comprising:
  (A) receiving a non-duplicate IP block from a terrestrial station by transmitting/receiving an IP request signal (AREQ) and an IP request response signal (AREP) generated from a data link layer by one-hop ship stations able to perform direct transmission/reception with the terrestrial station;
  (B) allowing the one-hop ship stations receiving IP blocks to determine IPs thereof, to perform data transmission/reception with the terrestrial station and to allocate IP blocks, as IP providers, to multi-hop ship stations able to perform indirect transmission/reception with the terrestrial station through ad-hoc communication, by not using any additional messages for detecting an IP provider and by utilizing an unchanging legacy MAC protocol, when the multi-hop ship stations request the IP blocks; and
  (C) determining one of the IP providers to transmit an IP request signal (AREQ) such that the determined IP provider transmits an IP request response signal (AREP) when multi-hop ship stations, to which the IP blocks are not allocated, receive MAC frames of plural IP providers in a channel allocation, wherein the (C) comprises:
   in response to the ship station receiving the IP request response signal (AREP),
   (a) confirming a payload when a start address of the received IP request response signal (AREP) is an IP provider to which the ship station requests the IP block and a destination address is same as an address of the ship station;
   (b) confirming whether a response to the IP request signal (AREQ) transmitted from the ship station is included when the destination address is a broadcast address;
   (c) setting a first IP of the IP block as its own IP of the ship station when an assignable signal (ACK) is received from the IP provider and updating an IP list;
   (d) selecting another ship station from an IP provider list when an unassignable signal (NACK) is received from the IP provider to retransmit the IP request signal (AREQ); and
   (e) performing the IP provider detection when no IP provider exists and updating the IP list.

2. The method of claim 1, wherein the (A) comprises:
  (a) allowing the terrestrial station to periodically transmit a beacon signal to announce subnet information and a location of the terrestrial station;
  (b) transmitting the IP request response signal (AREP) by determining the IP block based on location information of the IP request signal (AREQ) when the IP request signal (AREQ) is received from the one-hop ship station;
  (c) allocating the IP block by broadcasting the IP request response signal (AREP) once when the IP request signal (AREQ) is received from the one-hop ship stations;
  (d) updating an IP list which composes the IP block with the assigned IP; and
  (e) changing a state of an expired IP block into a 'free' state by updating the IP list when an expiration time (EX_Time) of the IP block arrives.

3. The method of claim 2, wherein the (b) comprises:
  (b-1) allowing the terrestrial station to divide a subnet into m hops after defining the ship or terrestrial station assigning the IP blocks as a IP provider (p) and the ship station requesting the IP block as an IP requester (r);
  (b-2) determining a hop number hr (1≤hr≤m) according to a location of the IP requester;

(b-3) allowing the terrestrial station to determine a size (nIPBr) of the IP block assigned to the IP requester according to the hop number; and (b-4) determining the size nIPBr of the IP block of the IP requester having a hop number of hr as w*2(m- hr+1), wherein the w is a weight element for further assigning an IP when the ship station re-requests the IP block.

4. The method of claim 1, wherein the (B) comprises:
allowing the one-hop ship station to allocate a channel to transmit the IP request signal (AREQ) after receiving a beacon signal from the terrestrial station; and
allowing the one-hop ship station to update an IP list and set a first IP of the IP block as an IP of the one-hop ship station when receiving the IP request response signal (AREP) from the terrestrial station.

5. The method of claim 4, wherein the (B) comprises:
(b-1) searching for an IP provider until the multi-hop ship station transmits the IP request signal (AREQ) to the channel allocated by the multi-hop ship station;
(b-2) receiving the beacon signal, the IP request response signal (AREP) and an MAC frame of an IP unassigned message to update an IP provider list;
(b-3) selecting one IP provider from the updated IP provider list to transmit the IP request signal (AREQ);
(b-4) randomly selecting one IP provider from the IP provider list when a number npro of the IP providers is two or more and only the IP providers transmitting the IP unassigned message exist; and
(b-5) selecting a ship station which transmits the beacon signal or the IP request response signal (AREP) when IP providers which transmit the IP unassigned message and the beacon signal or the IP request response signal (AREP) exist.

6. The method of claim 5, wherein, in the (b-5), when a number of the IP providers which transmit the beacon signal or the IP request response signal (AREP) is two or more, the IP provided is selected in a priority order of a sequence of a larger number (nAIPBp) of assignable IP blocks >a sequence of longer expiration times (EX_Time) >a sequence of a nearer location.

7. The method of claim 5, wherein the IP provider is a ship station which has a number nAIPBp of assignable IP blocks of '1' or more or transmits the IP unassigned message, among ship stations which transmit the beacon signal.

8. The method of claim 5, wherein the (B) further comprises:
calculating a number (NAREQ) of ship stations which transmit the IP request signal (AREQ) until the channel is allocated and comparing the number (NAREQ) of ship stations with a number of assignable IP blocks to determine an IP requester; and
broadcasting the IP request response signal (AREP) to the determined IP requester and updating an IP list.

9. The method of claim 8, wherein the determining of the IP requester comprises:
when the number (nAIPBp) of assignable IP blocks exceeds the number (NAREQ) of ship stations which transmit the IP request signals (AREQ), assigning an IP by using a number of IP blocks expressed as $$\left\lfloor \frac{n_{AIPB_p}}{N_{AREQ}+1} \right\rfloor;$$

when the number (nAIPBp) of assignable IP blocks is equal to or less than the number (NAREQ) of ship stations which transmit the IP request signals (AREQ), comparing a number of IP providers of the IP request signals (AREQ) with a value of unicast to select ship stations having the number (nAIPBp) of assignable IP blocks to assign one IP;

transmitting unassignable signal (NACK) by ship stations of (the number (nAIPBp) of assignable IP blocks - the number (nAIPBp) of assignable IP blocks); and re-requesting the IP block while increasing the value of unicast and transmitting the increased value to a corresponding IP provider when all the IP blocks are assigned to the IP requesters.

10. The method of claim 9, wherein selecting of the ship station is performed based on a priority order of a sequence of a less number (npro) of the IP providers>a sequence of larger values of unicast.

11. The method of claim 8, wherein the updating of the IP list comprises:
changing a state of the assigned IP block into 'Used' in a range of the assigned IP block; and
denoting a MAC address and an expiration time EX_Time of the IP requester.

12. The method of claim 5, wherein, in the updating of the IP provider list,
information obtained only from an IP provider, which transmits the beacon signal or the IP request response signal (AREP) for a number (nAIPBp) of assignable IP blocks an expiration time (EX_Time) and a location in a range of MAC addresses of all IP providers, is denoted.

13. The method of claim 2, wherein the updating of the IP list comprises:
changing a state of an assigned IP block into 'Used' in a range of whole subnet IPs; and
adding an MAC address and an expiration time (EX_Time) of a ship station requesting the assigned IP block.

14. The method of claim 4, wherein the updating of the IP list comprises:
changing a state of the assigned IP block into 'Used' in a range of whole subnet IPs; and
adding an MAC address and an expiration time (EX_Time) of a ship station requesting the assigned IP block.

15. The method of claim 1, wherein the updating of the IP list comprises:
changing the state of an assigned IP block into 'Used' in a range of the assigned IP block; and
denoting a MAC address and an expiration time (EX_Time) of the ship station.

16. The method of claim 15, wherein the (C) comprises:
periodically transmitting a beacon signal for announcing that the ship station is the IP provider when the ship station sets an IP thereof; and
updating the IP list by deleting an IP block that arrives at an expiration time when time arrives at the expiration time (EX_Time) and retrying a network entry for re-assigning of an IP.

* * * * *